Aug. 20, 1929.　　　　E. L. CHOTT　　　　1,725,058
WEIGHING SCALE
Filed Feb. 27, 1928
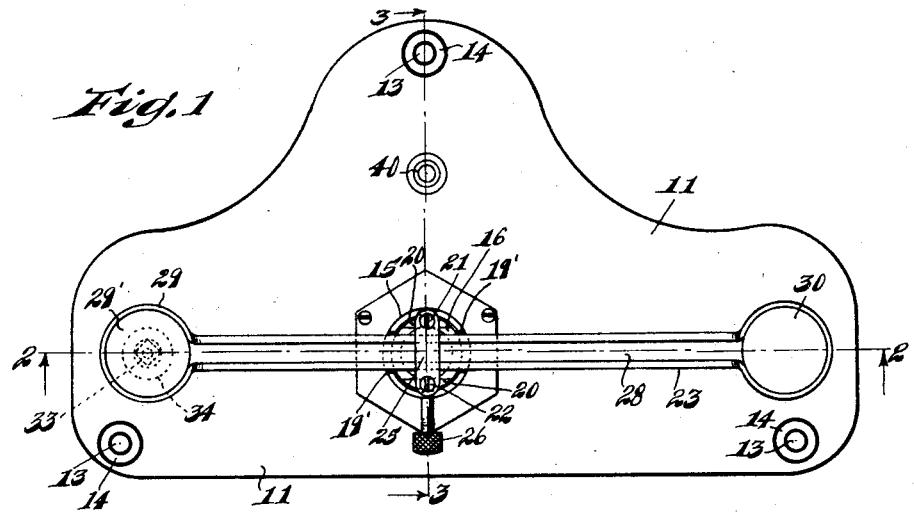
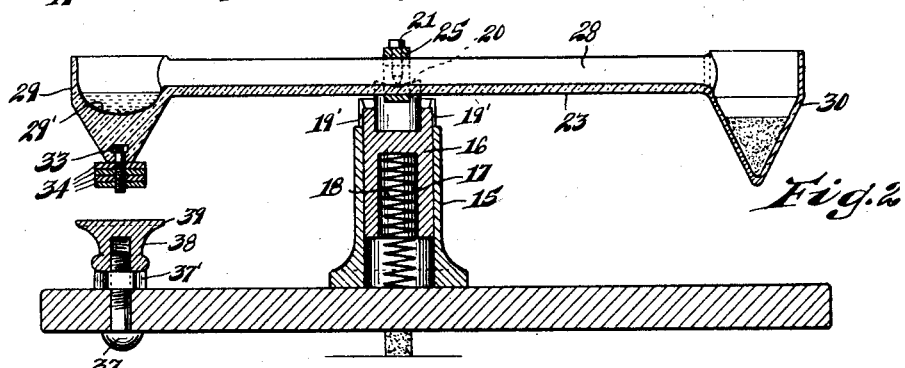
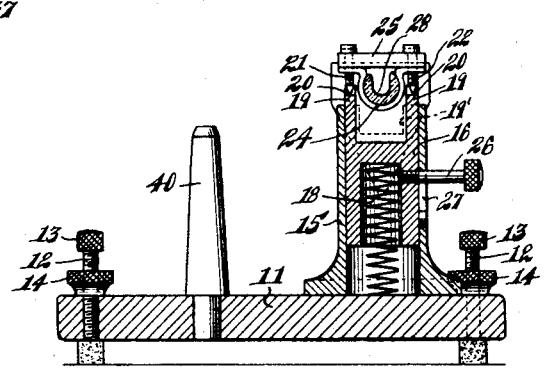
Inventor:
Edward L. Chott,
By Joshua R H Potts
his Attorney.
Witnesses:
C. E. Wessels
F. C. Appleton Patented Aug. 20, 1929.

1,725,058

UNITED STATES PATENT OFFICE.

EDWARD L. CHOTT, OF CHICAGO, ILLINOIS.

WEIGHING SCALE.

Application filed February 27, 1928. Serial No. 257,182.

This invention relates to weighing scales and more particularly to a scale providing means for the correct relative proportioning of ingredients necessary to produce a given amalgam mixture or combination.

The principal object of my invention is to provide a scale of the kind described whereby the relative proportions of amalgams and chemical mixtures of divers formulæ may be automatically determined by means of my invention.

Another object of my invention is to provide a scale particularly adapted for the proportion of the amalgams used in dental work.

Other objects and advantages of the method and construction employed will appear more fully in the hereinafter specification when taken in connection with the accompanying drawings, in which:

Fig. 1 is a plan view of my invention.

Fig. 2 is a cross sectional view thereof.

Fig. 3 is a cross section taken on line 3—3 of Fig. 1.

With more particular reference to the drawings wherein similar characters of reference indicate corresponding parts in the several views, 11 designates a base supported on threaded standards 12, having knurled adjusting heads 13, the threaded standards 12 meshing with adjusting nuts 14, providing a means of leveling the base for the more efficient operation of the scale.

Within the hollow column 15, screwed to the base 11 is a slidable plunger 16, having a recess 17 at one end thereof to receive a supporting coil spring 18, the plunger 16 being also provided with castellated projections 19 having hardened grooves 20, functioning as a bearing seat for the screw threaded pivots 21—22 which serve also as a means of adjustably and slidably securing the scale arm 23, the latter being confined by means of these pivots between yoke 24 and yoke strap 25. A pin 26 having a threaded connection with plunger 16, rides in a bayonet slot 27 whereby means are provided to lower the plunger 16 against the upward thrust of the spring 18, thereby permitting the unseating of pivots 21—22 and the reception of the scale arm 23 in the socket 19' formed between the two projecting castellations 19,—the scale in this manner being rendered inoperative while the pivots are correspondingly conserved from wear caused by oscillation.

As a particularly important feature of my invention, the scale arm 23 which is preferably formed of vulcanized rubber or similar material as a gutter 28 which communicates with a funnel-shaped cup 29—30 at each end thereof, ingredients being transferred from one cup to another through the gutter 28, after the weighing and correct proportions of the materials used have been automatically determined by the equilibrating property of the scale arm to be more fully described hereinafter. The cup 29 it will be noted is formed with a comparatively shallow recess 29' which serves as a convenient means of transferring the mercury therein to the cup 30 without an undue tilting of the scale arm 23, while the mercury is being transferred to the latter. Secured to the apex of the cup 29 in any suitable manner, is a threaded rod 33 which is adapted to receive adjustable weights in the form of discs 34 which may be of varying thickness for the purpose of providing a series of graduated weights.

To a bolt 37 fastened to base 11 by the nut 37' is an adjustable member 38 having a flared rim 39, the top of the adjustable member serving both as a check and a rest for the cup 29 during the weighing and mixing of the ingredients. As an added convenience I provide a post 40 which serves as a mount for dental capsules (not shown), preparatory to their being filled with amalgam. The theory and operation of my device will now be more fully apparent from the following brief description:

The amalgams used in dentistry are generally prepared by the dentist immediately prior to actual use, in order to avoid a premature hardening of the amalgam. The so-called silver amalgams are generally based on a 67% silver alloy which is triturated in a mortar with sufficient mercury to form the well known "silver amalgam" used as a filling for cavities in teeth. The plastic consistency of the freshly mixed silver amalgam is of course dependent upon the relative proportion of mercury to the silver alloy, it being desirable to have an easily moldable paste.

By means of my scale I am now enabled to effect a great convenience in the weighing and mixing of the components of the above referred to amalgams in the following manner:

Upon inspection of Figures 1, 2 and 3, the length $d$ of the right hand or power arm section of the scale arm 24 from the fulcrum point B located at the grooves 20, will be found greater than the length of the left hand or weight arm section $d'$ of the same scale arm, the discs 34 serving to counterbalance the disproportionate sections $d$ and $d'$ of the scale arm, thus producing equilibrium.

It will now be apparent that a given weight of mercury placed in the cup 29 will require a disproportionate, smaller weight of silver alloy to be put in cup 30 in order to counterbalance the scale arm, this procedure obeying the elementary laws of the lever as set forth in the equation $Wd=Pd'$, where W is the weight, P the power arm and $d-d'$ the distances or lengths of the left and right hand sections of the lever arm 23, respectively. Attention is directed to the graduated discs 34 which may be placed on the rod 33 in number sufficient to produce a "weight moment" on the weight arm $d$ requiring a compensating, greater or less weight or force to be placed on the alloy receiving or power arm $d'$. In this manner I am enabled to automatically proportion the ingredients of an indefinite number of alloys by the use of the graduating discs which may be incorporated into the recess of the nut 34.

It will now be obvious that after the scale arm 24 has been preliminarily slid to a position suitable for producing an amalgam of greater or less proportion of mercury or silver alloy, subsequent mixtures of the same formula, will be arrived at automatically by merely pouring in the ingredients into their respective cups 29—30 until the scale arm 24 swings into equilibrium.

Heretofore after the preliminary weighing of the ingredients it was necessary to pour same into a separate vessel preparatory to trituration. By means of the gutter 28, the mercury in cup 29 can now be transferred directly into cup 30 containing the silver alloy. The entire contents of cup 30 which includes the silver alloy and the mercury may then be dumped into a mortar and worked into the usual amalgam paste.

While I have described my invention particular with regard to the preparation of dental amalgams, I have found the device to be equally convenient when used for the mixing of paints, chemicals, food products, etc., and in fact wherever a mixture of definite given proportions is desired. The same method, as set forth above, will govern the preparation of these indicated mixtures by my scale, automatic proportioning of the components being obtained as set forth above.

It will be apparent that my device is susceptible to considerable variation and modification; hence, I do not confine myself to the precise details as set forth but wish to avail myself of such variations and modifications as fall within the scope of the appended claims.

What I claim as new and desire to secure by Letters Patent is:

1. In a scale of the kind described, a scale arm having a longitudinal passageway communicating with a container at each end thereof, whereby ingredients in one of said containers may be poured through said passageway into the other of said containers, substantially as described.

2. A scale of the kind described comprising a fulcrum supporting a scale arm, a container at each end of said scale arm, intercommunicating means secured to each of said containers, said intercommunicating means serving to transfer ingredients from one container to the other, and means to adjust said scale arm relatively to said fulcrum whereby said containers provide a means of automatically determining the relative proportions of ingredients necessary to a given mixture.

3. A scale of the kind described comprising a fulcrum support, a slidable and adjustable scale arm supported on said fulcrum support, a container at each end of said scale arm, a rod at the end of one of said containers accommodating a plurality of weights, and means to support in operative position and lock in inoperative position said scale arm, substantially as described.

4. A scale of the kind described comprising a scale arm slidably and adjustably supported on a standard serving as a fulcrum, a container at each end of said scale arm, said arm having a gutter providing a means for transposing ingredients from one container to the other, a threaded rod on one of said containers accommodating a plurality of graduated weighting discs, whereby means are provided to automatically proportion ingredients for the production of a given mixture.

5. A scale of the kind described comprising a scale arm slidably and adjustably supported on a standard serving as a fulcrum, means within said standard to place said scale arm in operative and inoperative position, a container at each end of said scale arm, the arm being joined by a gutter therebetween, and means at the bottom of one of said containers to receive a plurality of graduated weights, whereby diverse ingredients in the containers may be poured one into the other through said gutter, thereby automatically determining the correct amount of ingredients necessary for a given mixture when the scale arm swings in equilibrium.

6. A scale of the kind described comprising a scale arm, a yoke slidably adjustable on said scale arm and providing a means of support therefor on a standard serving as a fulcrum, a container at each end of said scale arm, the scale arm being joined by a passage therebetween, means to support in operative position and lock in inoperative position, said scale arm, and an adjustably supported leveling base whereon said standard is supported, substantially as described.

In testimony whereof, I have signed my name to this specification.

EDWARD L. CHOTT.